Dec. 23, 1947.   M. M. SEDWICK   2,433,068
SOLDER SPLASH ELIMINATOR
Filed May 1, 1944   2 Sheets-Sheet 1
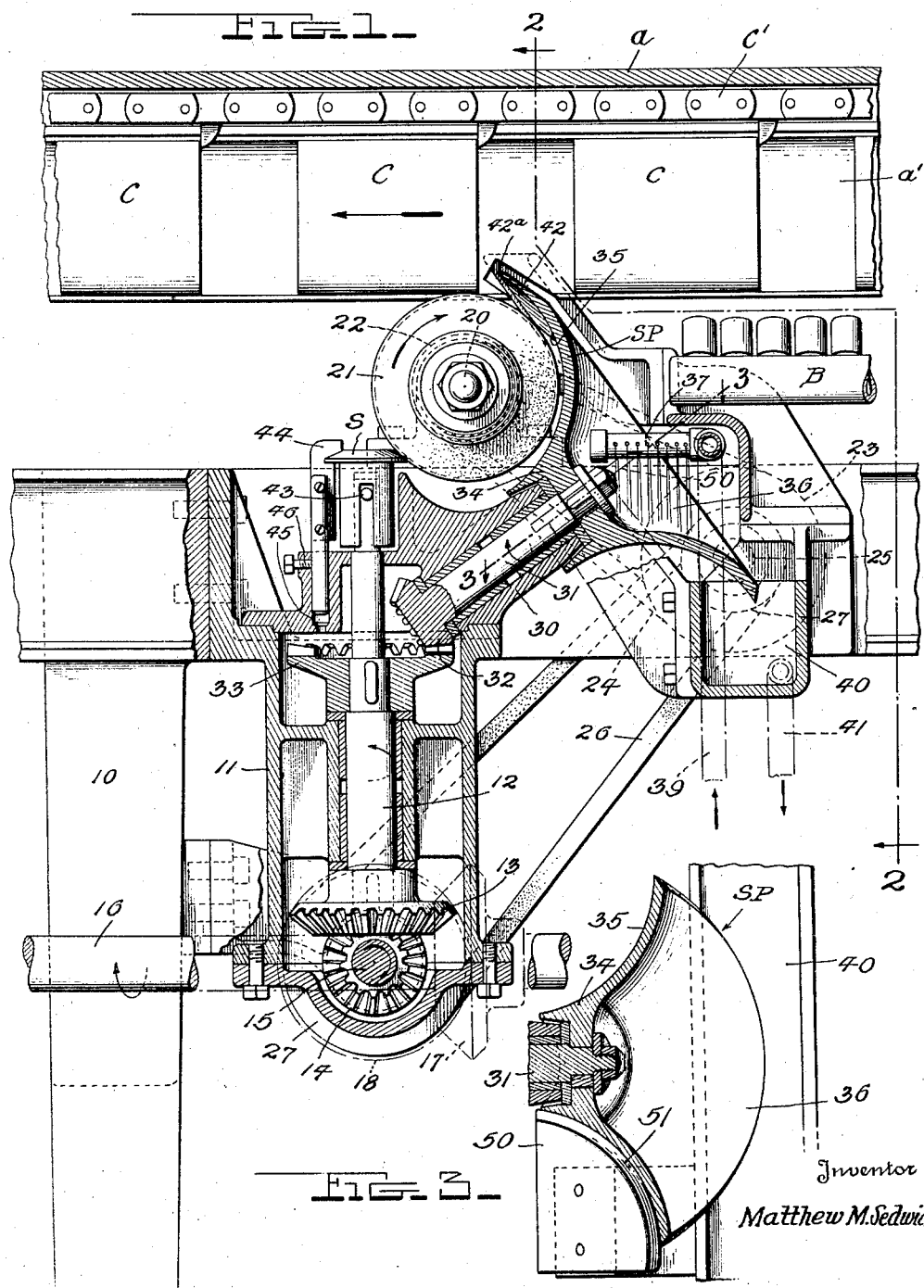
Inventor
Matthew M. Sedwick
By Mason, Porter & Diller
Attorneys Dec. 23, 1947.  M. M. SEDWICK  2,433,068
SOLDER SPLASH ELIMINATOR
Filed May 1, 1944  2 Sheets-Sheet 2
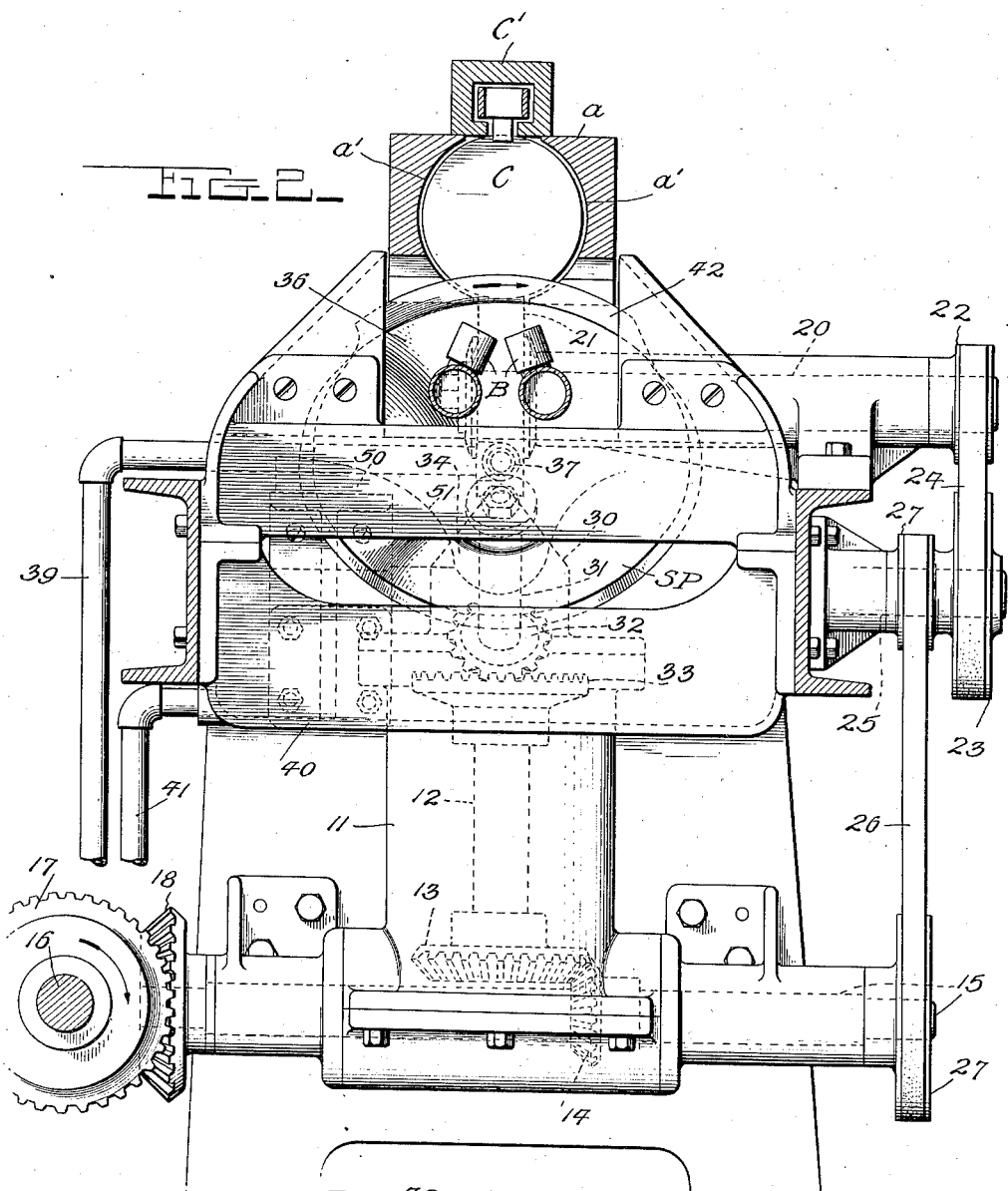
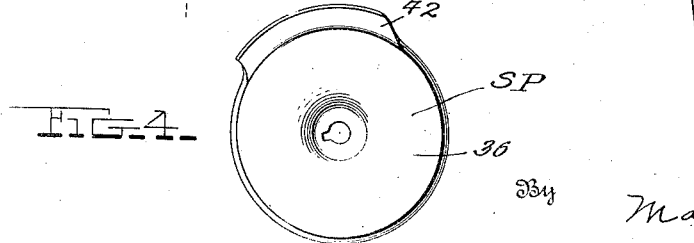
Inventor
Matthew M. Sedwick Patented Dec. 23, 1947

2,433,068

UNITED STATES PATENT OFFICE 2,433,068

SOLDER SPLASH ELIMINATOR

Matthew M. Sedwick, Syracuse, N. Y., assignor to Continental Can Company, Inc., New York, N. Y., a corporation of New York Application May 1, 1944, Serial No. 533,563

5 Claims. (Cl. 113—97)

This invention is a solder-splash eliminator for can-soldering-machines of the type commonly employed in the soldering of side seams of can bodies.

Due to the fact that molten solder, while being wiped from the seam of a travelling can body, is likely to be thrown into the space between the can body being wiped and the next approaching can body, it is customary to provide splash shields which will move into and out of such spaces, and in such manner as to shield the open ends of the can bodies against the entry of such solder. Heretofore, after solder has been applied to the side seams of a can body, it has been the common practice to remove any surplus solder which may adhere to the outer surface of the can body, by means of a rotating fiber wiper. When, due to the shortage of tin, it became necessary to change to the use of silver solder for the soldering of side seams of can bodies, difficulty was experienced in preventing the setting of the solder before the wiper could perform its operation. Therefore, it was found that a much higher temperature than previously required for the purpose, was necessary to keep the solder in a molten state long enough to permit the wiper to complete is functions. To accomplish this result, burners have been positioned to apply additional heat to the can bodies after the initial soldering operation. These burners, however, are apt to so scorch or burn the wiper as to seriously damage it and impair its functions.

One of the objects of the present invention is to provide a splasher shield which may be operated in coordination with the speed of travel of the can bodies in such manner as to intercept any solder which might be thrown off from the wiper by centrifugal force, so as to prevent such solder being thrown into the open ends of the travelling can bodies.

A further object of the invention is to provide a stationary guard around the solder splash shield and the wiper wheel which protects the same from the heat of the burners used in the heating of the can body seam just prior to the wiping of the same.

The invention will be hereinafter fully set forth and particularly pointed out in the claims.

In the accompanying drawings:

Figure 1 is a vertical sectional view centrally through the horn and extending longitudinally thereof and also centrally through the shield, the supporting means therefor and the means for rotating the same and showing the can bodies and the wiper wheel in side elevation.

Figure 2 is a vertical sectional view on the line 2—2 of Figure 1.

Figure 3 is a detail sectional view illustrating the solder splash shield and the means for scraping the same to remove accumulated solder.

Figure 4 is a detail plan view of the solder splash shield.

Referring to the drawing, 10 designates the supporting frame of the wiper section of a can soldering mechanism, which latter may be of any preferred or well known construction.

In practice, the can bodies are fed from the usual soldering mechanism (not shown) through a horn $a$ of any suitable construction. For the purposes of illustration, said horn is shown as comprising two oppositely disposed members, each having an inwardly curved surface $a'$, concentric with and complemental to the cross sectional contours of the can bodies C. The latter are propelled through the horn by means of a conveyor $C'$, in such manner that the cans are caused to travel successively and in relatively spaced relationship from the soldering device to the wiping mechanism to be hereinafter described, supported by the frame 10. It is well understood in the art that a certain amount of the solder initially applied to seal the side seam will be permanently deposited in the recess formed by the seam, and that there is also a certain amount of surplus solder which accumulates on the outside of the can body. This surplus solder must be removed to perform a perfect job, and the wiping mechanism about to be described is designed for this purpose.

Depending from the frame 10 is a vertically disposed housing 11, in which is rotatively mounted a drive shaft 12. Said shaft is provided at its lower end with a bevel gear 13 which meshes with a complemental bevel gear 14, on a countershaft 15. The countershaft is driven in any suitable manner, such as by means of a power shaft 16 connected with any suitable source of power and provided with a bevel gear 17 meshing with a complemental pinion 18 carried by said shaft 15.

Rotatively mounted in suitable bearings carried by the frame 10 is the wiper shaft 20, to which a wiper disk 21 is removably secured, so as to rotate therewith. Said wiper disk may be of ordinary construction. The shaft 20 is driven in any suitable manner, but for purposes of illustration, it is shown as provided with a pulley 22 which is operatively connected with a pulley 23 by means of a belt 24. Said pulley 23 is mounted on a stub shaft 25 suitably mounted in the frame 10. The shaft 25 is driven by a belt 26 which connects a pulley 27 on the stub shaft 25 with a drive pulley 28 on the shaft 15.

Supported between the housing 11 and the wiper 21 is a bearing member 30, having a bearing portion which is inclined with respect to the line of travel of the can bodies, and in which is rotatively mounted a shaft 31. Said shaft has a bevel pinion 32 which meshes with the drive gear 33, mounted on and rotatable with the shaft 12. Secured to the shaft 31, so as to rotate therewith, is a splasher shield SP formed with a flaring head 34 of circular shape in plan view. The flaring under surface 35 of said shield is concave in radial cross section to approximately a curvature which is concentric with the axis of the wiper. This permits the splash shield to be placed close to the wiper and thus protect the oncoming can just as long as possible before it contacts with the wiper. The upper surface of the head 34 is provided with a depression or chamber 36 adapted to accommodate a spray head 37, so that water or other liquid coolant is applied to the wiper shield, so as to minimize adhesion of molten solder thereto. The coolant is supplied to the spray head 37 in any preferred manner, such as by a supply pipe 39.

In practice, the coolant fluid is sprayed upon the upper surface of the head 34 by the spray head 37, in such manner that it will flow off by gravity into a catch chamber 40, from which it is drained by a pipe 41. The head 34 is preferably circular in plan view, as shown in Figure 4. Extending from a portion of the periphery of said head 34 is a segmental flange 42 which functions to intercept any solder which may be thrown by the wiper, by centrifugal force, into the open ends of approaching can bodies. Said flange is so positioned that during rotation of the splash shield SP, it will pass through the space in advance of each approaching can body, and above the plane of operation of the wiper, in such manner as to intercept any solder which is thrown from the wiper by centrifugal force, before it can be directed into the open end of the approaching can body. Slidingly mounted on the upper end of the shaft 12 is a rotatable scraper S, having a slot therein which engages a pin 43 carried by said shaft, so that the scraper will rotate with the shaft. Said scraper is supported by a member 44, which is held in any adjusted position within a socket 45 by means of a set screw 46.

In practice, as the can bodies approach the wiper the burners B direct their flames against the surfaces on opposite sides of the can seam, so as to maintain the surplus solder adhering to said surfaces, in a sufficiently molten condition to permit of its removal by the friction of the rotating wiper 21. The splash shield flange 42 is so positioned on the shield SP that it will travel through the space between each pair of can bodies, at a sufficient distance above the plane of the wiper operations to intercept any solder which might be otherwise thrown from the wiper, into the open end of the approaching can, by the centrifugal force developed by the rotation of the wiper. In operation, the speed of rotation of the head 34 is predetermined with respect to the speed of travel of the can bodies as they approach the wiper. The circumferential length of the splash flange 42 is such that during each rotation of said head, the flange is moved into and out of the space before the forward end of the next succeeding can reaches the wiper 21. Any solder which remains attached to the wiper during the performance of its functions, is removed by means of the scraper S. During the wiping operations, the splash shield SP is kept cool by means of the streams of water from the sprinkler head 37, so as to minimize accumulation of solder on the under surface thereof. Any solder thrown from the wiper disk 21 and which accumulates on the concaved underside of said wiper shield, is removed by means of a scraper 50 fixedly secured to the frame, and having a scraping edge 51 complemental to the curvature of the underside of said head.

The advantages of the invention will be readily understood by those skilled in the art to which it belongs. For instance, it will be noted that by inclining the splash-shield, so that the portion thereof which lies just below the can sides seam, it is caused to operate as closely as possible to the wiping point. A further advantage is that the concaved or flared shape of the splash-shield provides a continuous arcuate surface, which can easily be kept clean by the scraper blade, and allows the shield to be placed very close to the wiper. In fact, the arcuate surface extends well around the wiper, and over the disk hub, so that the shield will catch solder thereon from the wiper, over the widest possible area. Another advantage is that as the splash-shield rotates only in time with the can-travel, and not at an equivalent lineal speed, the speed of revolution of the splash-shield can be high, so that the segmental splash-shield flange can be kept between the cans a maximum period of time, so as to protect the oncoming can to the latest possible instant. An important advantage is that the splash-shield, during its rotation, is at all times performing splash shielding functions, first, by reason of its inclined position over the wiper and second, because the extended splash-shield flange functions to provide additional splash protection at the critical instant of wiping, i. e. when a can is just leaving the wiper. Another advantage is that the flared shape of the shield provides a large area to be exposed to the cooling liquid, so that this area naturally corresponds as nearly as possible to the area acted upon by the scraper. Therefore, by spraying a coolant material on the shield, the solder thrown against the latter is chilled and prevented from adhering to any extent thereon.

Having thus explained the nature of the invention and described an operative manner of constructing and using the same, although without attempting to set forth all of the forms in which it may be made, or all of the forms of its use, what is claimed is:

1. A wiping mechanism for soldering machines comprising a supporting frame, a wiper disk mounted in said frame, means for rotating said disk, means for causing can bodies to travel successively past and in contact with the wiper disk, a wiper shield disposed adjacent the wiper disk on the side thereof approached by the can bodies, and means for rotating said shield, said shield being mounted on an axis inclined to the line of travel of the can bodies and having the surface thereof nearest the wiper disk shaped so that it is substantially concentric in radial cross section to the axis of the wiper disk, whereby said shield may be placed close to the wiper disk, said shield having a segmental flange projecting from the periphery thereof which flange is positioned and timed so as to move into and out of the space in front of the open end of each approaching can body before it reaches the wiper disk.

2. A wiping mechanism for soldering machines comprising a supporting frame, a wiper disk mounted in said frame, means for rotating said disk, means for causing can bodies to travel successively past and in contact with the wiper disk, means for applying heat to the can bodies prior to contact with the wiper disk to prevent setting of surplus solder adhering to the can bodies, a wiper shield disposed adjacent the wiper disk and between said disk and said heating means, and means for rotating said shield, and said shield being mounted on an axis inclined to the line of travel of the can bodies and having the surface thereof nearest the wiper disk shaped so that it is substantially concentric in radial cross section to the axis of the wiper disk, whereby said shield may be placed close to the wiper disk, said shield having a segmental flange projecting from the periphery thereof which flange is positioned and timed so as to move into and out of the space in front of the open end of each approaching can body before it reaches the wiper disk.

3. A wiping mechanism for soldering machines comprising a supporting frame, a wiper disk mounted in said frame, means for rotating said disk, means for causing can bodies to travel successively past and in contact with the wiper disk, means for applying heat to the can bodies prior to contact with the wiper disk to prevent setting of surplus solder adhering to the can bodies, a wiper shield disposed adjacent the wiper disk and between said disk and said heating means, means for rotating the wiper shield, said shield being mounted on an axis inclined to the line of travel of the can bodies and having the surface thereof nearest the wiper disk shaped so that it is substantially concentric in radial cross section to the axis of the wiper disk, whereby said shield may be placed close to the wiper disk, the outer face of said wiper shield having a recessed portion and means for discharging a coolant medium within said recessed portion.

4. A wiping mechanism for soldering machines comprising a supporting frame, a wiper disk mounted in said frame, means for rotating said disk, means for causing can bodies to travel successively past and in contact with the wiper disk, means for applying heat to the can bodies prior to contact with the wiper disk to prevent setting of surplus solder adhering to the can bodies, a wiper shield disposed adjacent the wiper disk and between said disk and said heating means, means for rotating the wiper shield, said shield being mounted on an axis inclined to the line of travel of the can bodies and having the surface thereof nearest the wiper disk shaped so that it is substantially concentric in radial cross section to the axis of the wiper disk, whereby said shield may be placed close to the wiper disk, said shield having a segmental flange projecting from the periphery thereof which flange is positioned and timed so as to move into and out of the space in front of the open end of each approaching can body before it reaches the wiper disk, a scraper shaped to conform to the radial cross section of the wiper shield and disposed so as to contact therewith on a line at a distance from the wiper disk for removing solder collecting on the shield.

5. A wiping mechanism for soldering machines comprising a supporting frame, a wiper disk mounted in said frame, means for rotating said disk, means for causing can bodies to travel successively past and in contact with the wiper disk, means for applying heat to the can bodies prior to contact with the wiper disk to prevent setting of surplus solder adhering to the can bodies, a wiper shield disposed adjacent the wiper disk and between said disk and said heating means, means for rotating the wiper shield, said shield being mounted on an axis inclined to the line of travel of the can bodies and having the surface thereof nearest the wiper disk shaped so that it is substantially concentric in radial cross section to the axis of the wiper disk, whereby said shield may be placed close to the wiper disk, the outer face of said wiper shield having a recessed portion and means for discharging a coolant medium within said recessed portion, a scraper shaped to conform to the radial cross section of the wiper shield and disposed so as to contact therewith on a line at a distance from the wiper disk for removing solder collecting on the shield.

MATTHEW M. SEDWICK.

REFERENCES CITED

The following references are of record in the file of this patent:

UNITED STATES PATENTS

| Number | Name | Date |
| --- | --- | --- |
| 1,223,557 | Cameron | Apr. 24, 1917 |
| 1,884,935 | Walter | Oct. 25, 1932 |
| 867,030 | Gardner | Sept. 24, 1907 |
| 2,266,792 | O'Neil | Dec. 23, 1941 |
| 2,275,415 | Boone | Mar. 10, 1942 |